3,399,194
REACTIVE DYESTUFFS
Angelo Mangini, Germana Mazzanti, and Antonio Tundo, Bologna, Italy, assignors to Aziende Colori Nazionali Affini ACNA S.p.A., Milan, Italy
No Drawing. Filed Apr. 21, 1964, Ser. No. 361,553
Claims priority, application Italy, Apr. 26, 1963, 8,708/63; Aug. 8, 1963, 16,515/63
2 Claims. (Cl. 260—249)

ABSTRACT OF THE DISCLOSURE

Dyestuffs containing as the reactive group

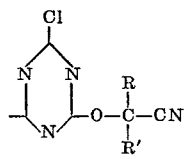

wherein R is an aliphatic group containing 1 to 5 carbon atoms, and R' is aliphatic of 1–5 carbon atoms and H. Illustratory are dyestuffs of the formula

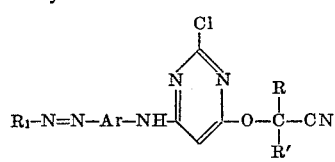

wherein R and R' have the above meaning, Ar is substituted or unsubstituted benzene, naphthalene or diphenyl and $R_1$ is a radical of sulphonated pyrazolone derivatives, sulphonated naphthylamines, sulphonated naphthols, sulphonated amino-naphthols and anthraquinones. Process also disclosed.

---

Our invention relates to a new class of reactive dyestuffs and more particularly of dyestuffs capable of forming during dyeing chemical bonds with the hydroxyl groups of cellulose, thereby yielding dyes particularly resistant to laundering.

Several classes of dyestuffs having such reactive groups are known, in particular dyestuffs including one of the following reactive groups: monochlorotriazine, dichlorotriazine, dichloropyrimidine, beta-chloropropionamine, vinylsulphone and furthermore monohalodinitro-, monohalotrinitro-, dihalodinitro-, trihalotrinitro-benzene groups.

The methods for application of these dyestuffs vary depending upon the reactivity of their reactive groups.

This invention is based on the discovery of a new class of dyestuffs having as reactive group the radical (I)

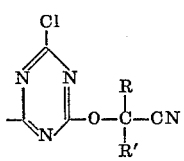 (I)

wherein R is an aliphatic chain containing from 1 to 5 carbon atoms; R' is hydrogen or an aliphatic chain containing from 1 to 5 carbon atoms the same as or different from R.

Said dyestuffs containing this reactive group with the mobile halogen, when bound to a colored residue, enable, under suitable conditions, said halogen to react with the OH of the cellulosic materials, or with $NH_2$ and NH groups of natural and synthetic polyamides, thus creating covalent chemical bonds between dyestuff and fiber.

The chlorine on the triazine nucleus in the triazine derivatives having in the triazine nucleus the substituting group

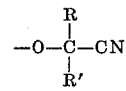

has a higher reactivity than chlorines on triazines having other substituents, such as the amino group, the amino group mono- or disubstituted with alkyl, aralkyl, alkylaryl, heterocyclic radicals, optionally substituted with an appropriate functional group of the organic chemistry.

The higher reactivity exhibited by dyestuffs having as reactive group the radical:

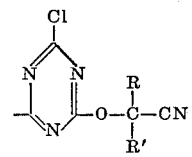

wherein R and R' have the above-mentioned meaning with respect to the dyestuffs containing the reactive radical (II)

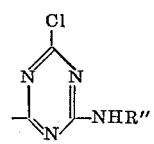

(II)

wherein R" is an alkylic or arylic residue optionally substituted, can be shown, in a preliminary way, by the fact that, while the condensation between an arylamine and the Compound III takes place at 5–8° C., the condensation between the Compound IV and the same arylamine takes place at a temperature of 35–40° C.:

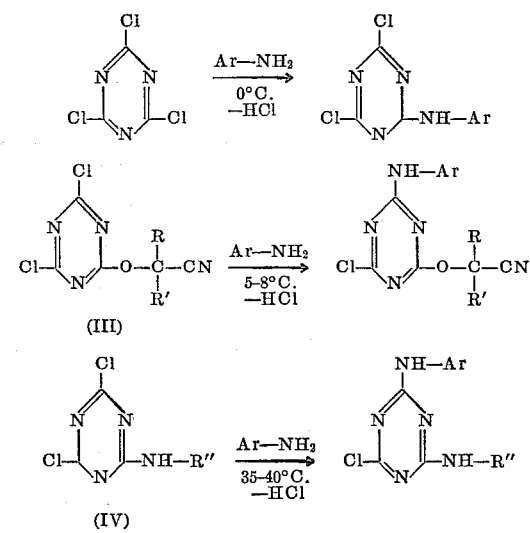

(R"=alkyl or aryl residue)

This remarkably improved reactivity with respect to the reactive triazine dyestuffs of the known art allows the application of said dyestuffs at a lower temperature; using a somewhat smaller amount of alcohols (with consequent decrease of the costs) and with a greater velocity, thus favoring the use of continuous dyeing methods. The above-mentioned advantages exist also in the textile printing procedures.

The reactive potentialty of cyanuric chloride is reduced by the presence of the

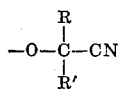

group wherein R and R' have the above-mentioned meaning in such a measure as to reach the right degree of reactivity. It is well known that an excessive reactivity, like that of some dichlorotriazine dyestuffs, causes a certain instability in drying and storage. The receptivity of the fiber toward the dye is also increased, causing color effects of limited uniformity.

All the reactive dyestuffs belonging to the class of this invention dye cellulosic fibers in the presenec of electrolytes, from an alkaline bath. They differ from the known dyestuffs because of their particular dyeing power and of the better fastness to light. Shades particularly fast to laundering are obtained.

The dyestuffs according to the present invention are prepared by reacting cyanuric chloride with KCN and a carbonylic compound (a ketone or an aldehyde) having the following general formula:

in which R and R' have the above-indicated meanings, and subsequently condensing the thus obtained triazine (V) with the desired aromatic diamine.

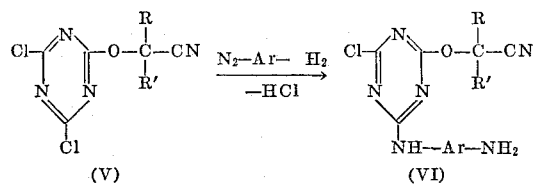

wherein Ar is a differently substituted benzene, naphthalene, diphenyl nucleus, etc.

By diazotizing the amine (VI) and coupling with various coupling agents the reactive dyestuffs having the structure (VII):

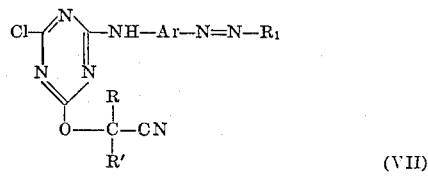

in which $R_1$ is a radical of sulphonated pyrazolone derivative, sulphonated naphthylamine, sulphonated naphthol, sulphonated aminonaphthol, etc. are obtained.

Another method to obtain dyestuffs according to the present invention consists in reacting the triazine (V) with differently substituted aminonaphthols, obtaining Compound VIII:

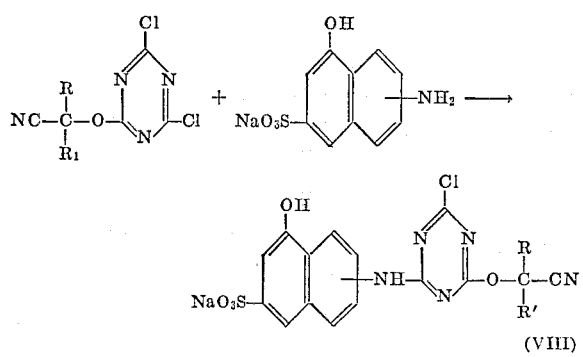

By coupling said Compound VIII with the desired diazonium salt, the reactive dyestuffs (IX):

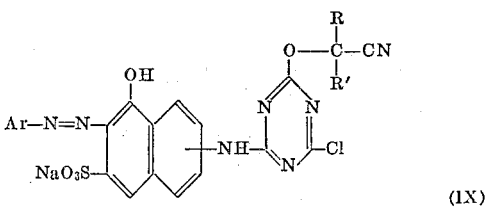

wherein Ar is a suitably substituted benzene, naphthalene, or diphenyl nucleus, are obtained.

Triazine (V) can also be directly condensed with phthalocyanines or with sulphonated azo or anthraquinone dyestuffs containing a free amino group to originate directly the reactive dyestuffs (X):

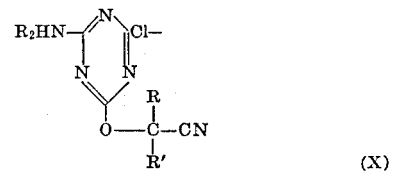

wherein $R_2$ is a generic colored residue (azo, phthalocyanine or sulphonated anthraquinone group).

According to another aspect of this invention, buffering agents, such as for instance borates or phosphates, mixtures of monosodium phosphate and disodium diphosphate, may be added for the stabilization of these dyestuffs for storage.

The following examples illustrate the present invention, but are not intended to limit the scope of the invention neither for the products obtained, nor for their preparation process, nor for the dyeing processes.

EXAMPLE 1

Preparation of triazine (XI):

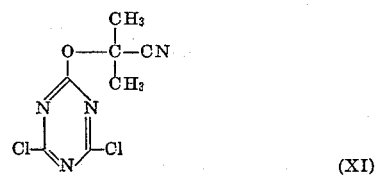

30 g. of cyanuric chloride are dissolved in 200 cc. acetone and 50 g. of crushed ice are added to the solution. The suspension thus obtained is first neutralized with 10% $Na_2CO_3$ and then an aqueous solution of potassium cyanide (KCN 10.6 g.; $H_2O$ 150 cc.) is added dropwise, at 2–3° C., during about 45 minutes.

During the dropwise addition of potassium cyanide, the pH of the reaction mass is 9.5–10.

At the end of the addition of KCN (45 minutes) the pH of the suspension gradually decreases and after further 30–40 minutes is 6.5.

The suspension is neutralized and diluted with water and ice ($H_2O$ 200 cc.; ice 200 g.) and then is filtered. The precipitate is carefully washed with water and then dried under vacuum.

The product after crystallization from n-hexane melts at 90–91° C.

Preparation of the amine

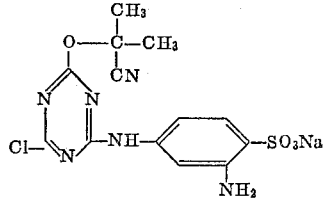

0.1 mol of triazine (XI) is dissolved in 50 cc. acetone and the solution is poured into 100 cc. water and 100 g. ice. In the thus obtained emulsion the aqueous neutral solution consisting of 0.1 mol of sulphonated m-phenylenediamine (200 cc. water) containing 0.1 mol of sodium acetate is poured dropwise during 45 minutes and under agitation. The temperature of the reaction mass is allowed to rise spontaneously to 20° C.

At the end of the addition, the whole is further agitated for 5–6 hours and the solution obtained is neutralized with 10% Na₂CO₃.

The thus obtained solution is used as such for the preparation of the dyestuff:

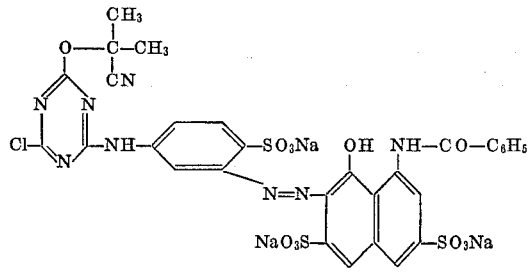

0.1 mol of amine, obtained as above described, is directly diazotized and the diazonium salt thus obtained is coupled at 4–6° C. with 0.1 mol of the benzoyl —H acid at pH=8.5 At the end of the addition of the diazonium salt, the reaction mass is agitated for 3–4 hours, the pH is adjusted to 7.2 and the mass is salted out. The precipitate thus obtained is centrifuged and dried at 40° C. It dyes cotton in red shade fast to washing.

EXAMPLE 2

If as a coupling agent for the amine prepared according to the preceding example instead of the sulphonated m-phenylenediamine, 1-(4'-sulpho-phenyl) - 3 - methyl-5-pyrazolone is used, a dyestuff having the following structure:

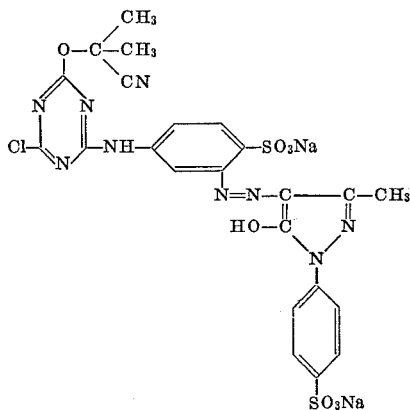

is obtained; it dyes cotton in yellow, very fast to wet treatments.

EXAMPLE 3

By coupling the amine prepared according to Example 1 with the benzoyl-K acid, the following dyestuff:

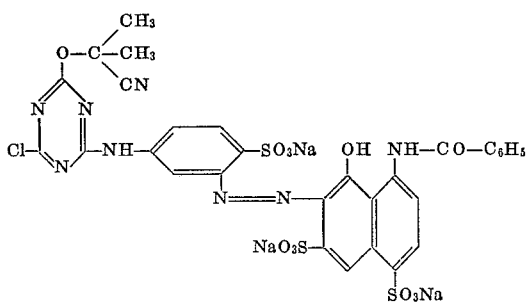

is obtained; it dyes cotton in a red shade, very fast to wet treatments.

EXAMPLE 4

Using as coupling agent of the amine prepared according to Example 1, the 1-(2',5'-dichloro-4'-sulphophenyl)-3-methyl-5-pyrazolone, the following dyestuff is obtained which dyes the cellulose fibers in a yellow shade, fast to washing.

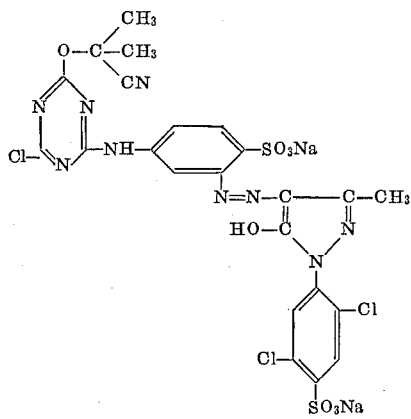

EXAMPLE 5

By working as described in the preceding examples and using as coupling agent the ureido of the isogamma acid, the dyestuff:

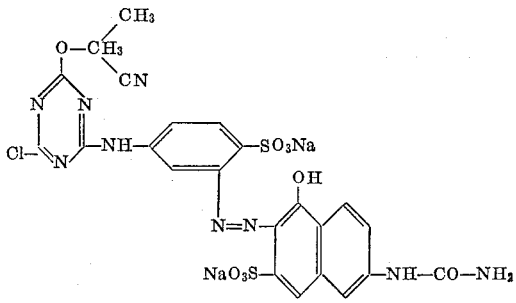

is obtained, which dyes cotton in a fast orange shade.

EXAMPLE 6

A dyestuff having the following structure:

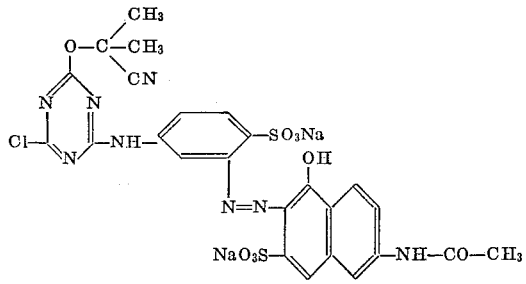

is obtained in a way similar to that used for obtaining the preceding dyestuffs, using as coupling agent the acetyl-isogamma acid.

This dyestuff dyes cotton in an orange shade very fast to washing.

EXAMPLE 7

Preparation of the triazinic dyestuff having the following structure:

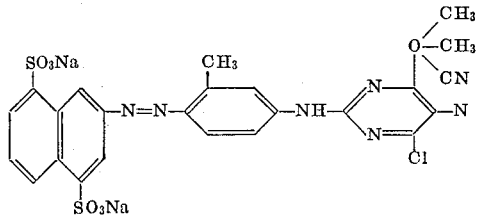

30 g. of the triazine (XI) are dissolved in 15 cc. of acetone and are poured into 50 g. of water and ice. In the suspension kept under agitation an aqueous solution containing 1.4 g. of sodium acetate and 7.3 g. of the amine

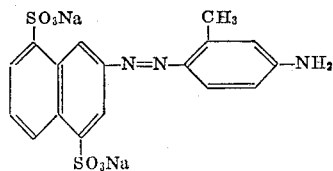

dissolved in 280 cc. of water is poured dropwise.

After the addition, the temperature is allowed to reach 20–25° C. and the whole is agitated until solution is completed (4–6 hours). The solution is then neutralized with 10% $Na_2CO_3$ and salted out; after centrifugation and drying, a yellow powder, which dyes cotton in a fast yellow shade, is obtained.

EXAMPLE 8

10 g. of the above-mentioned triazine (XI) are dissolved in 40 cc. of acetone and poured into 50 cc. of water and 50 g. of ice. Into the thus obtained suspension, a solution consisting of 15 g. of isogamma acid (99.4%), dissolved in 350 cc. water and neutralized, and 4.7 g. of sodium acetate is poured dropwise during 1 hour and under agitation.

The temperature is allowed to reach 20–25° C. and the agitation is continued for 5–6 hours. After neutralization the thus obtained solution containing the naphthol

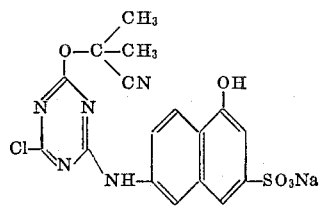

is used as such for preparing the following dyestuff:

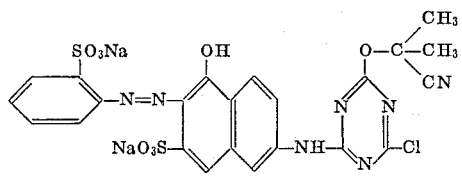

It is obtained by coupling in slightly alkaline medium the diazonium salt of the orthanilic acid with the condensation product between isogamma acid and the triazine (XI).

The dyestuff dyes cotton in a very fast orange shade.

EXAMPLE 9

By working as described in Example 8 and using the diazonium salt of the Tobias acid, the following dyestuff

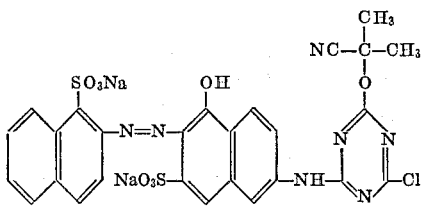

is obtained; it dyes cotton in a very fast orange shade.

EXAMPLE 10

By working as described in Example 8 and using the diazonium salt of the m-amino-benzoic acid, the following dyestuff:

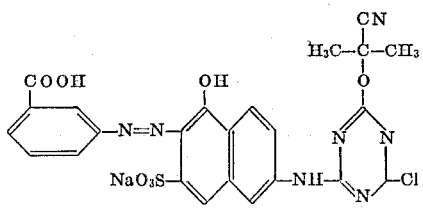

is obtained; it dyes the cellulosic fibers in a brilliant and fast orange shade.

EXAMPLE 11

The triazine dyestuff having the structure:

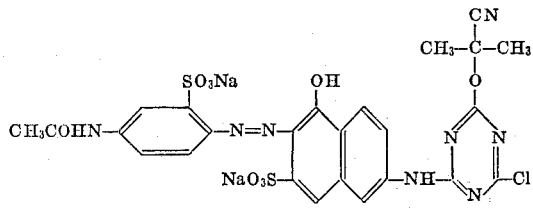

is obtained by coupling the diazonium salt of the 1-amino-2-sulpho-4-acetyl-amino-benzene with the condensation product of the triazine (XI) with isogamma acid, in a slightly alkaline medium (pH=8.5). The dyestuff dyes cotton in a fast scarlet shade.

EXAMPLE 12

By working as described in Example 8 and using the diazonium salt of the amino G acid the following dyestuff:

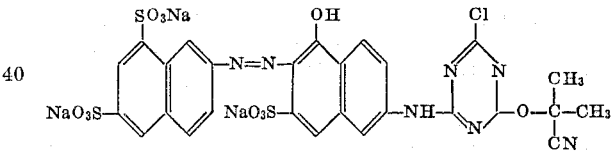

is obtained; it dyes cotton in a scarlet fast shade.

EXAMPLE 13

2.8 g. of the triazine derivative (XI) are dissolved in 20 cc. of acetone and the solution is poured into 40 cc. of water and 40 g. of ice, under agitation. Then an aqueous solution consisting of 8.5 g. of 1-amino-2-sulpho-4-(4'-amino-3'-sulpho-anilino)-anthraquinone, 2.2 g. of crystallized sodium acetate and 130 cc. of water is added and the whole is heated at 40° C., under agitation, for 3–4 hours.

After cooling, the mass is neutralized and salted out.

The precipitate is collected by centrifugation and dried at 40° C.

The dyestuff has the following structure:

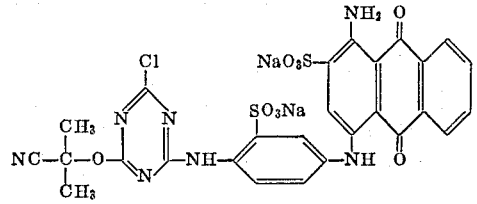

and dyes cotton in a very fast blue shade.

EXAMPLE 14

13.8 g. of

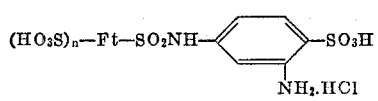

wherein Ft is a copper phthalocyanine chromogen, are suspended in 200 cc. of water and neutralized in order to have a complete solution. Then, 2.1 g. of sodium acetate are added and the resulting solution is quickly poured dropwise into the suspension of 25 cc. of acetone and 25 cc. water of the triazine derivative (XI) (4.6 g.) and cooled with ice.

The whole is heated at 40° C., for 3–4 hours, with agitation. After neutralization the whole is salted out and the precipitate is collected by centrifugation.

The dyestuff has the following structure:

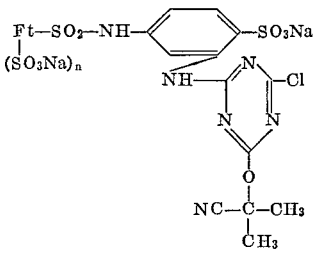

and dyes cotton in a very fast turquoise shade.

EXAMPLE 15

Preparation of triazine (XII):

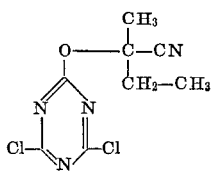

(XII)

30 g. of cyanuric chloride are dissolved in 230 cc. of methylethylketone and to this solution 55 g. of crushed ice are added. The thus obtained suspension is first neutralized with 10%-Na₂CO₃ and then an aqueous solution of potassium cyanide (10.6 g. of KCN; 150 cc. of H₂O) is added dropwise at 4–6° C. over about 50 minutes.

During the KCN dropping the pH of the reaction mass is 9.5–10. When KCN addition (50 minutes) is finished, the pH of the suspension gradually decreases and after further 35–45 minutes is 6.5. The suspension is neutralized and diluted with water and ice (220 cc. of H₂O, 220 g. of ice) and filtered. The precipitate is thoroughly washed with water and then dried under vacuum.

The product is crystallized from n-hexane.

Preparation of the amine (XIII)

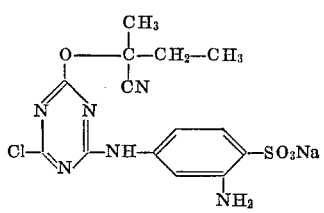

(XIII)

0.1 mol of triazine (XII) is dissolved in 55 cc. of acetone and the solution is poured into 120 cc. of water and 120 g. of ice. Into the thus obtained emulsion is dropped within 45 minutes, under stirring, the neutral aqueous solution of 0.1 mol of sulphonated m-phenylenediamine (220 cc. of water), containing 0.1 mol of sodium acetate, while the temperature of the reaction mass is allowed to rise spontaneously to 20° C.

When the addition is finished, stirring is continued for further 5–6 hours and then the obtained solution is neutralized with 10%-Na₂CO₃.

The thus obtained solution is employed as such for the preparation of the following dyestuff:

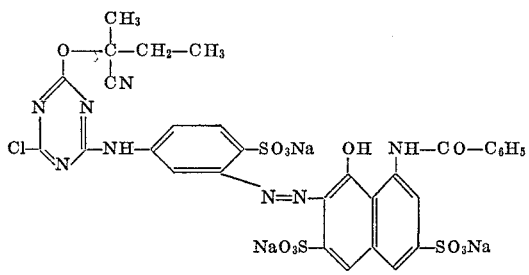

0.1 mol of amine, obtained as indicated above, is directly diazotized and the diazonium salt obtained is coupled at 4–6° C. with 0.1 mol of benzoyl-H acid at pH 8.5.

When the addition of the diazonium salt is finished, the reaction mass is stirred for 3–4 hours, the pH is adjusted to 7.2, and it is salted out.

The precipitate obtained is centrifuged and dried at 40° C.; it dyes cotton in a red shade, fast to washing.

EXAMPLE 16

When 1 - (4' - sulpho-phenyl)-3-methyl-5-pyrazolone is used as coupling agent for the amine (XIII), prepared according to the preceding example, a dyestuff having the following structure is obtained:

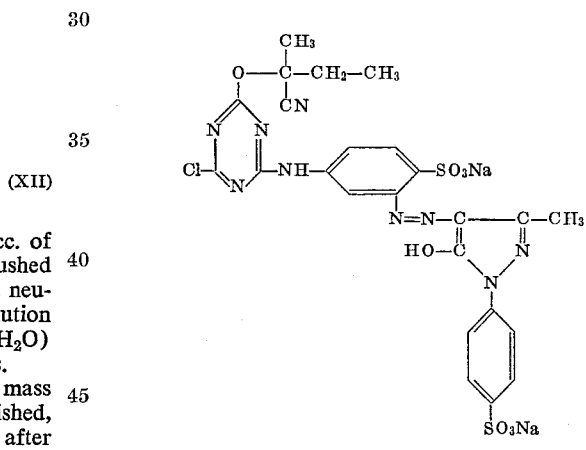

which dyes cotton in a yellow shade, very fast to wet treatments.

EXAMPLE 17

By coupling the amine (XIII), prepared according to Example 15, with benzoyl-K acid the following dyestuff is obtained:

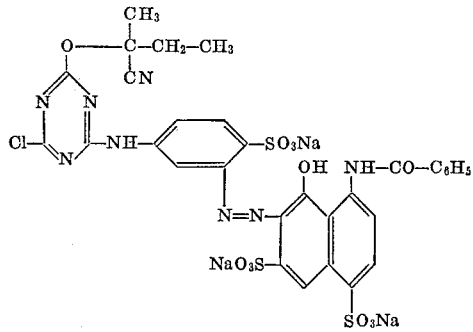

which dyes cotton in a very fast red shade.

EXAMPLE 18

Employing as coupling agent for the amine prepared according to Example 15, 1 - (2',5'-dichloro-4'-sulphophenyl)-3-methyl-5-pyrazolone, the following dyestuff is obtained, which dyes cellulosic fibers in a yellow shade, fast to washing.

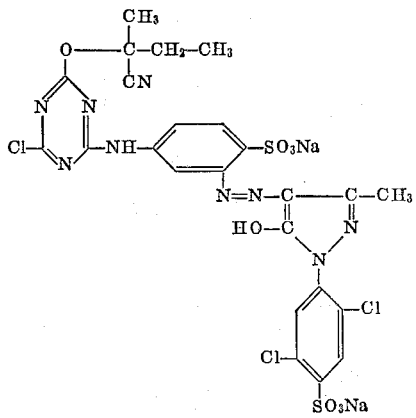

EXAMPLE 19

Starting from the amine (XIII), prepared according to Example 15, working as in the preceding examples and using ureide of isogamma acid as coupling agent, the following dyestuff is obtained:

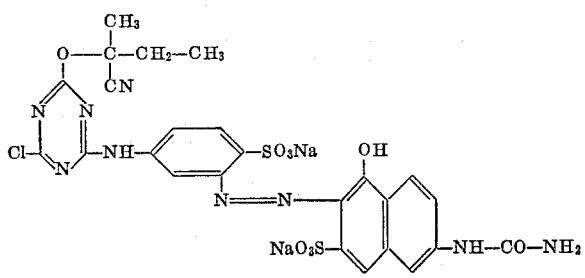

which dyes cotton in a fast orange shade.

EXAMPLE 20

A dyestuff having the following structure:

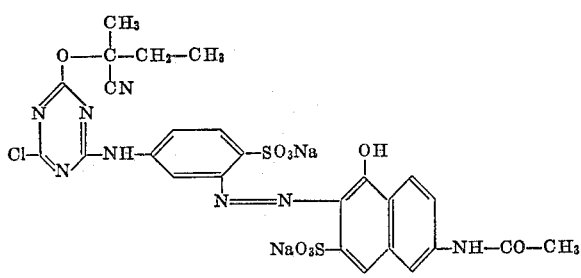

is obtained from the amine (XIII) analogously to the preceding example, using acetyl isogamma acid as coupling agent.

Said dyestuff dyes cotton in an orange shade, very fast to wet treatments.

EXAMPLE 21

Preparation of the triazine dyestuff having the structure:

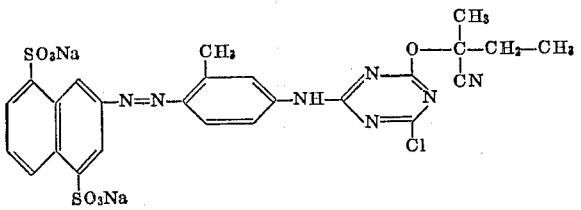

3 g. of the triazine XII are dissolved in 18 cc. of acetone and poured into 55 g. of water and ice. An aqueous solution containing 1.4 g. of sodium acetate and 7.3 g. of the amine:

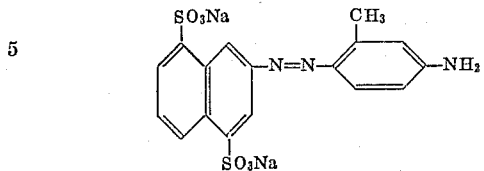

dissolved in 280 cc. of water is added dropwise to the suspension, kept under agitation.

When the addition is completed, the temperature is allowed to rise to 20–25° C. and the suspension is stirred till complete solution is reached (4–6 hours); the solution is neutralized with 10%-$Na_2CO_3$ and salted out: after centrifugation and drying, a yellow powder is obtained, which dyes cotton in a fast yellow shade.

EXAMPLE 22

11 g. of said triazine (XII) are dissolved in 40 cc. of acetone and poured into 50 cc. of water and 50 g. of ice.

To the thus obtained suspension a solution consisting of 15 g. of isogamma acid (99.4%), dissolved in 350 cc. of water, and neutralized with 4.7 g. of $CH_3COONa$, is added dropwise within one hour and under stirring.

The temperature is allowed to rise to 20–25° C. and stirring is continued for 5–6 hours. After neutralization, the solution obtained containing the naphthol:

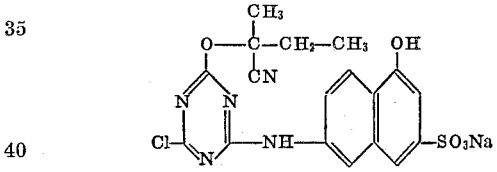

is employed to prepare the following dyestuff:

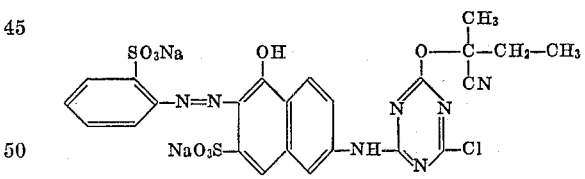

Said dyestuff is obtained by coupling in a slightly alkaline medium, the diazonium salt of orthanilic acid with the condensation product of isogamma acid with the triazine (XII).

It dyes cotton in a very fast orange shade.

EXAMPLE 23

By operating as described in Example 22 and using the diazonium salt of Tobias acid, the following dyestuff is obtained:

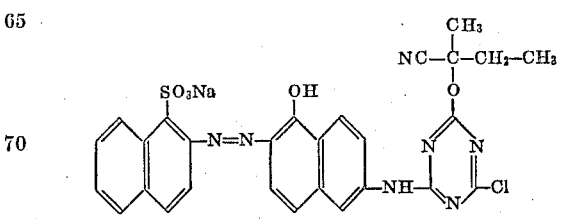

which dyes cotton in a very fast orange shade.

EXAMPLE 24

By operating as described in Example 22 and employing the diazonium salt of m-amino-benzoic acid, the following dyestuff is obtained:

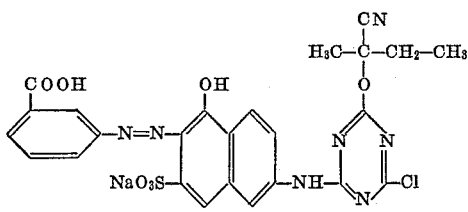

which dyes cellulosic fibers in a brilliant orange shade.

EXAMPLE 25

The triazine dyestuff having the structure:

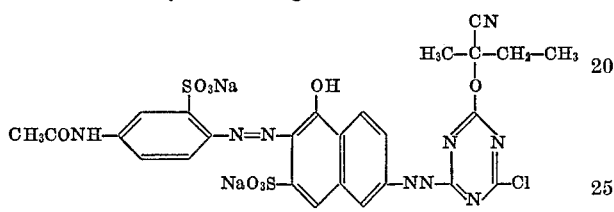

is obtained by coupling, in a slightly alkaline medium (pH=8.5), the diazonium salt of 1-amino-2-sulpho-4-acetylaminobenzene with the condensation product of the triazine (XII) with isogamma acid.

It dyes cotton in a fast scarlet shade.

EXAMPLE 26

By operating as described in Example 22, and employing the diazonium salt of amino G acid, the following dyestuff is obtained:

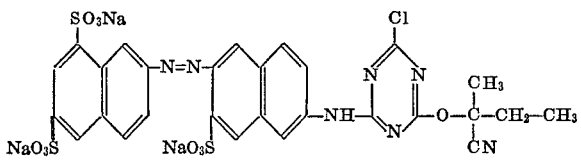

which dyes cotton in a fast scarlet shade.

EXAMPLE 27

3 g. of triazine derivative (XII) are dissolved in 20 cc. of acetone and the solution is poured into 45 cc. of water and 45 g. of ice, keeping it in agitation. Then an aqueous solution, containing 8.5 g. of 1-amino-2-sulpho-4(4'-amino-3'-sulpho-anilino)-anthraquinone, 2.2 g. of crystallized sodium acetate and 130 cc. of water, is added and the whole is heated to 40° C. under stirring, for 3–4 hours.

After cooling, the solution is neutralized and salted out. The precipitate formed is centrifuged and dried at 40° C.

The dyestuff has the structure:

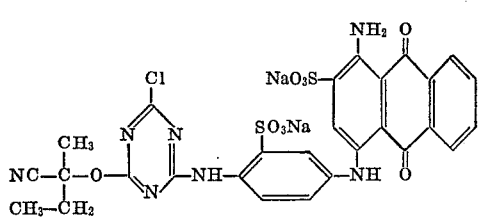

and dyes cotton in a very fast blue shade.

EXAMPLE 28

13.8 g. of

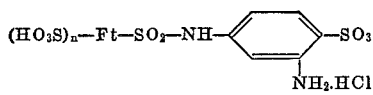

(wherein Ft is a copper phthalocyanine chromogen) are suspended in 200 cc. of water and neutralized in order to obtain a complete solution. Then 2.1 g. of sodium acetate are added and the solution obetained is rapidly added dropwise to the suspension in acetone (25 cc.) and water (25 cc.) of the triazine derivative (XII) (4.8 g.), cooled with ice.

The whole is heated to 40° C. for 3–4 hours, keeping it in agitation; after neutralization it is salted out and the precipitate is collected for centrifugation.

The dyestuff has the following structure:

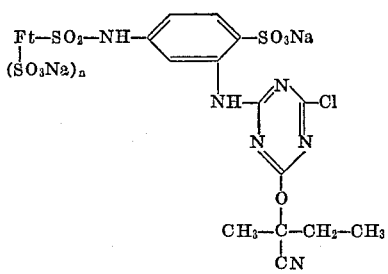

and dyes cotton in very fast shade.

EXAMPLE 29

2 parts of dyestuff obtained according to any of the preceding examples from 15 to 28 are dissolved cold in 2000 parts of water. The dyeing bath thus obtained is brought to a temperature of 60° C., and 100 parts of wetted cotton yarn are introduced into the bath.

Then two about equal doses of sodium sulphate are added in an amount corresponding to a concentration of 40 g./l.; the first addition is made after 5 minutes, the second after 10 minutes.

Thereafter the temperature of the dyeing bath is lowered to 50° C. in 20 minutes, 5–8 g./l. of anhydrous sodium carbonate are added, and the dyeing is continued for 60 minutes.

Now the bath is emptied and the yarn is thoroughly washed first with cold water, then with boiling water, and finally with a solution of non-ionic detergent (1–3 g./l.) for 30 minutes. A particularly stable dyeing in brilliant shades is obtained.

EXAMPLE 30

A 10 g. cotton lea is immersed in a bath consisting of 0.2 g. of the dyestuff prepared according to Example 13 and dissolved in 200 ml. of water, and then the temperature is raised up to 60° C. 40 g./l. $Na_2SO_4$ are added and the temperature is permitted to drop to 50° C. in 20–30 minutes.

At this temperature 8 g./l. $Na_2CO_3$, preferably in two doses with a 10-minute interval, are added and the dyeing is continued for 1 hour.

The cotton lea is rinsed with cold water, then with hot water, and is treated for 30 minutes with a solution containing 2 g./l. of a non-ionic detergent. Then the material is rinsed many times with cold water and dried.

The cotton lea is dyed in a blue shade having very good fastness to wet treatments and to light.

EXAMPLE 31

A cellulosic fabric is impregnated in a "foulard" with a solution consisting of 30 g./l. of the dyestuff according to Example 3, 15–20 ml./l. of 36° Bé. NaOH, 10 g./l. $Na_2SO_4$, and the liquid in excess is wrung out so that the dyestuff solution retained in the fabric amounts to only 80% of its weight. The fabric thus impregnated is wound on a roller and insulated from the room by a polyethylene cover or other insulating material.

After 3 or 4 hours the roller is unwound and the fabric is washed many times in cold water and then in hot water saponified for 30 minutes with a solution containing 2 g./l. of a non-ionic detergent. The cellulose fabric appears dyed with a red shade very fast to wet treatments and to light.

We claim:
1. The dyestuff having the structure:

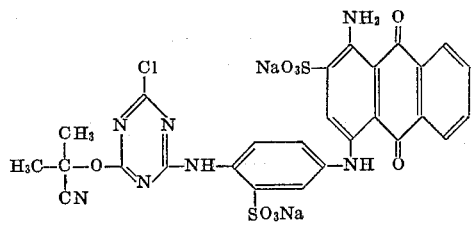

2. The dyestuff having the structure:

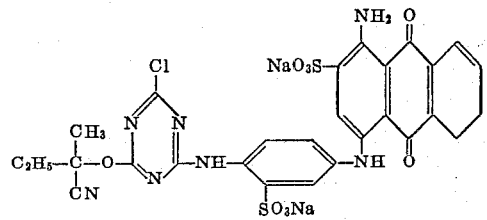

References Cited

UNITED STATES PATENTS 3,065,191 11/1962 Heslop et al. _____ 260—249
3,254,084 5/1966 Fleischhauer et al. ___ 260—249
3,313,830 4/1967 Braun et al. _____ 260—249

JOHN D. RANDOLPH, Primary Examiner.

J. M. FORD, Assistant Examiner.